United States Patent [19]

Sells et al.

[11] 4,437,945

[45] Mar. 20, 1984

[54] PROCESS FOR ANODIZING ALUMINUM FOIL

[75] Inventors: Mary A. Sells, Seymour; John W. Scott, Clinton, both of Tenn.

[73] Assignee: Sprague Electric Company, North Adams, Mass.

[21] Appl. No.: 528,182

[22] Filed: Aug. 31, 1983

[51] Int. Cl.$^3$ ............. C25C 11/08; C25C 11/12; C25C 11/16

[52] U.S. Cl. .............. 204/35 N; 204/38 A; 204/42; 204/58

[58] Field of Search .......... 204/29, 38 A, 42, 58, 204/35 N

[56] References Cited

U.S. PATENT DOCUMENTS

| | | | |
|---|---|---|---|
| 1,012,889 | 12/1911 | Mershon | 204/58 |
| 1,068,410 | 7/1913 | Chubb | 204/58 |
| 1,658,976 | 2/1928 | Edelman | 204/58 |
| 2,076,904 | 4/1937 | Lilienfeld | 204/58 |
| 2,116,449 | 5/1938 | Robinson | 204/58 |
| 4,252,575 | 2/1981 | Bernard | 204/38 A |

FOREIGN PATENT DOCUMENTS 50-40468  10/1975  Japan ..................... 204/42

*Primary Examiner*—R. L. Andrews

[57] ABSTRACT

In an integrated process for the anodization of aluminum foil for electrolytic capacitors including the formation of a hydrous oxide layer on the foil and stabilization of the foil in alkaline borax baths, the foil is electrochemically anodized in an aqueous solution of monosodium phosphate having a pH of 3.5 to 5.0 as electrolyte. The anodization is interrupted for stabilization of the foil by passing it through a bath containing a borax solution having a pH of 8.5 to 9.5 at a temperature of above 80° C., and then reanodizing the foil. The process is useful in anodizing foil to a voltage of up to 550 V.

5 Claims, No Drawings

PROCESS FOR ANODIZING ALUMINUM FOIL

BACKGROUND OF THE INVENTION

This invention relates to an integrated process for the anodization of aluminum electrolytic capacitor foil. A hydrous layer is first formed on the foil, and then it is electrochemically anodized in a bath containing monosodium phosphate at a pH of 3.5 to 5.0. Anodization is interrupted to stabilize the foil by passing it through a bath containing a borax solution at a pH of 8.5 to 9.5 and a temperature of above 80° C. Thereafter, the foil is reanodized in the monosodium phosphate electrolyte. Foil suitable for use in electrolytic capacitors for up to 550 V service is produced by this process.

Improvements have been made in both the manufacture of aluminum foil for electrolytic capacitors and in the etching of said foil resulting in the capability of producing higher voltage foil than had been possible until recently. The improvements resulted in a need for anodization processes capable of producing higher voltage dielectric oxide films to take advantage of these newer foils and etching processes.

It has been customary to form a hydrous oxide layer on aluminun foil prior to the anodization of aluminum foil for service above about 200 V. Usually, this layer is formed by passing the foil into boiling deionized water. This layer permits anodization to above 200 V and permits power savings during anodization and a higher capacitance per given anodization voltages. Although the use of a hydrous oxide layer is not new, the mechanism by which it produces the above results is still not understood.

The prior art has shown the use of borate and citrate electrolytes for anodization up to 500 V, generally up to about 450 V. The anodization process which was capable of producing 500 V foil was an excessively lengthy and cumbersome process not suitable for present day manufacturing schemes. In particular, the stabilization or depolarization time required was excessively long.

This stabilization or depolarization is needed as it is well-documented that aluminum capacitor foil after apparently complete formation of a high voltage dielectric oxide film evidences instability as shown by a sudden loss of field strength. This behavior is most markedly observed when the foil also bears a hydrous oxide layer formed prior to anodization. There is general agreement in the electrolytic capacitor industry that this dielectric instability is caused by the creation of voids within the formed dielectric oxide layer. It has been further postulated that oxygen gas is trapped within these voids and is liberated during the stabilization or "depolarization" treatment that brings about a relaxation in the strength of the dielectric.

Whatever the actual physical mechanism which may be involved, it is known to remedy the situation by various so-called depolarizing techniques—heating, immersion in hot water with and without various additives, mechanical flexing, pulsed currents, current reversal, or a combination of these—in short, methods which tend to relax or crack the dielectric barrier layer oxide so that these voids may be filled with additional dielectric oxide and thereby impart permanent stability to the oxide film.

One such process is described by Walter J. Bernard in a copending application filed on even date herewith. His process involves passing anodized foil through a bath containing preferably an aqueous borax solution having a pH of 8.5 to 9.5 at a temperature of 80° C. or above and then reanodizing the foil. While boric acid or borax at acidic pH control the hydration of aluminum foil, at the mildly alkaline pH above, borax is more effective than the hot water reaction in opening up the dielectric film. In addition to opening up this film, borax seems to attack the excess hydrous oxide present without damaging the barrier layer dielectric oxide and leads to the formation of a stable dielectric oxide upon subsequent re-anodization of the foil.

SUMMARY OF THE INVENTION

This invention features an integrated process for the anodization of aluminum electrolytic capacitor foil, particularly up to 550 V. It involves first forming a hydrous oxide layer on the foil by immersing the foil in boiling deionized water and then subjecting the foil to electrochemical anodization in a bath containing an aqueous solution of monosodium phosphate at a pH of 3.5 to 5.0 as electrolyte. The foil is then passed through a bath containing a borax solution (0.001 to 0.05 M) having a pH of 8.5 to 9.5 at a temperature of 80° C. or higher and then reanodized in the monosodium phosphate electrolyte. A stabilized foil suitable for up to 550 V use is produced.

It is postulated that the combination of acidic anodization electrolyte and alkaline treating bath set up a type of acid-base reaction on the foil surface leading to the stabilization of the foil and its high dielectric strength. The presence of phosphate in the anodizing electrolyte is needed in order to completely stabilize the foil. The phosphate initiates stabilization so that only hydrous oxide is dissolved in the alkaline borax bath without damaging the barrier layer dielectric oxide. The alkaline borax bath, in turn, renders the surface of the foil slightly alkaline (presumably a sodium aluminate surface) so that it reacts electrochemically with the phosphate during the reanodization step with the phosphate being incorporated into the dielectric oxide thus completing stabilization and improving dielectric strength. It has been found that this latter reaction is an electrochemical one; soaking the foil in a phosphate medium does not give the same results.

The pH of the anodizing solution is maintained by the addition of small amounts of phosphoric acid as required. Below a pH of 3.5, anodization efficiency decreases and the solution also begins to attack the foil. Above a pH of 5, the alkali metal cation begins to interfere with dielectric oxide quality. The sodium monophosphate is preferred to the ammonium salt because of environmental problems with ammonium in waste waters and is preferred to other alkali metal salts because of commercial availability and economics. Phosphoric acid is not preferred per se because of its acidity and consequent destruction of the fine etch structure, i.e., electropolishing results. The borax concentration in the stabilizing or depolarizing baths is about 1% for the reasons discussed in the above-noted Bernard application. At least two borax treatments are used and preferably three to ensure complete stabilization of the foil.

The concentration of monosodium phosphate in the anodizing bath is determined by the desired final voltage of the foil. For production of foil in the 150 to 380 V range, sufficient phosphate is used to provide a resistivity of 400–1100 ohm-cm while for formations up to about 550 volts, the resistivity range is 1400–1600 ohm-cm. The lower resistivities correspond to lower final voltages desired and the higher ones, to higher final voltages.

DESCRIPTION OF THE PREFERRED EMBODIMENTS

Aluminum foil is passed through a bath of hot deionized water at about 96° C. to form a layer of hydrous oxide on it. It is then passed to an electrochemical anodization stage using as electrolyte an aqueous solution of monosodium phosphate at a pH of 3.5 to 5.0 and at about 90° C. to be anodized to the desired end voltage which may be as high as 550 V. The anodization temperature is kept at about 90° C. as above 95° C., the bath boils over and below about 85° C., oxide quality is poorer.

The foil is next passed to a stabilizing or depolarizing section containing, preferably, a 1% borax solution having a pH of 8.5–9.5 and at a temperature of 85° C. or above, preferably about 96° C. The foil is then reanodized in the phosphate electrolyte to the same desired end voltage. The stabilization-reanodization steps are repeated, at least once and preferably twice. The following example shows the utility of the foil produced by this process.

EXAMPLE 1

Foil was anodized as described above to a final voltage of 350 V in the monosodium phosphate electrolyte. In this case, its resistivity was 1300 ohm-cm. Three borax treatments were used to stabilize the foil. The foil was used to make 1200 µF/250 V AC capacitors and placed on life testing at 85° C. Results are given below for 2000 hrs. of testing. Capacitance (C) is in microfarads, equivalent series resistance (ESR) in milliohms, DC leakage (DCL) in microamps, and capacitance and ESR changes as percentages (ΔC and ΔESR).

TABLE 1

| Hours | Cap | ESR | DCL | ΔC | ΔESR |
|---|---|---|---|---|---|
| 0 | 1.24 | 52 | 97 | 0 | 0 |
| 250 | 1.24 | 59 | 53 | −.47 | 13.15 |
| 500 | 1.23 | 65 | 47 | −1.24 | 24.42 |
| 1500 | 1.21 | 67 | 45 | −2.29 | 29.22 |
| 2000 | 1.20 | 70 | 39 | −3.08 | 33.88 |

By comparison, a commercial unit of the same rating, made with foil which was anodized in a boric acid-tartaric acid electrolyte, after 2000 hrs. showed the following values: capacitance 1.26 µF, ESR 83 mΩ, DCL 33 µA, ΔC −0.5%, and ΔESR 60.4%, showing the overall improved results obtained from foil prepared by the present invention. In addition, AC capacitors prepared using foil of the present invention successfully survived 33,500 1-second starts.

What is claimed is:

1. In an improved process for electrochemically anodizing aluminum electrolytic capacitor foil including the formation of a hydrous oxide layer on said foil before anodizing, then anodizing said foil and repeatedly interrupting said anodizing to subject the foil to a stabilizing treatment in a mildly alkaline borate bath of at least 80° C., the improvement comprising carrying out said anodizing in a bath containing monosodium phosphate and having a pH of 3.5 to 5.0.

2. A process according to claim 1 wherein said pH is controlled by the addition of phosphoric acid.

3. A process according to claim 1 wherein the resistivity of said monophosphate is 400 to 1600 ohm-cm.

4. A process according to claim 1 wherein the concentration of said phosphate is 0.2 to 1.5 g/l.

5. A process according to claim 1 wherein said foil is anodized to a voltage of up to 550 V.

* * * * *